United States Patent
Ji et al.

(10) Patent No.: US 7,924,703 B2
(45) Date of Patent: Apr. 12, 2011

(54) SYSTEM AND METHOD FOR AN EMBS DESIGN TO OPTIMIZE SPECTRUM EFFICIENCY, LINK ADAPTATION AND EMBS TRAFFIC SECURITY

(75) Inventors: Baowei Ji, Plano, TX (US); Kaushik Josiam, Dallas, TX (US); Zhouyue Pi, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 119 days.

(21) Appl. No.: 12/456,119

(22) Filed: Jun. 11, 2009

(65) Prior Publication Data

US 2010/0085867 A1    Apr. 8, 2010

Related U.S. Application Data

(60) Provisional application No. 61/195,573, filed on Oct. 8, 2008.

(51) Int. Cl.
*H04J 1/16* (2006.01)
*H04H 20/71* (2008.01)

(52) U.S. Cl. .................. 370/216; 370/312

(58) Field of Classification Search .......... 370/216, 370/241, 252, 310, 312; 455/403, 422.1, 455/452.2, 509
See application file for complete search history.

(56) References Cited

U.S. PATENT DOCUMENTS

| | | | | |
|---|---|---|---|---|
| 6,115,390 | A * | 9/2000 | Chuah | 370/443 |
| 6,987,764 | B2 * | 1/2006 | Hsu | 370/390 |
| 2005/0143085 | A1 * | 6/2005 | Bi et al. | 455/452.2 |
| 2006/0045038 | A1 * | 3/2006 | Kay et al. | 370/316 |
| 2007/0002977 | A1 * | 1/2007 | Cho et al. | 375/340 |
| 2007/0014237 | A1 * | 1/2007 | Nishibayashi et al. | 370/229 |
| 2009/0080351 | A1 * | 3/2009 | Ryu et al. | 370/312 |
| 2009/0225692 | A1 * | 9/2009 | Son | 370/312 |
| 2010/0075704 | A1 * | 3/2010 | McHenry et al. | 455/509 |
| 2010/0172279 | A1 * | 7/2010 | Chen et al. | 370/312 |

FOREIGN PATENT DOCUMENTS

KR    10-2007-0085730    8/2007

OTHER PUBLICATIONS

International Search Report and Written Opinion of International Searching Authority dated Apr. 30, 2010 in connection with International Application No. PCT/KR2009/005722.

* cited by examiner

*Primary Examiner* — Chi H Pham
*Assistant Examiner* — Robert Lopata (57) ABSTRACT

A wireless communication network capable of providing Enhanced Multi-Broadcast Service (EMBS) to a plurality of subscriber stations. At least one base station in the network transmits a downlink frame to the plurality of subscriber stations. The downlink frame includes an EMBS MAP configured to identify locations of EMBS data bursts. The downlink frame also includes a security and data multiplexing burst and EMBS data burst. A number of the subscriber stations are configured to decode the EMBS MAP to determine the locations of a number of EMBS data burst in a number of subsequent downlink frames.

23 Claims, 8 Drawing Sheets

SYSTEM AND METHOD FOR AN EMBS DESIGN TO OPTIMIZE SPECTRUM EFFICIENCY, LINK ADAPTATION AND EMBS TRAFFIC SECURITY

CROSS-REFERENCE TO RELATED APPLICATION(S) AND CLAIM OF PRIORITY

The present application is related to U.S. Provisional Patent No. 61/195,573, filed Oct. 8, 2008, entitled "EMBS DESIGN IN CONSIDERATION OF SPECTRUM EFFICIENCY AND LINK ADAPTATION AND EMBS TRAFFIC SECURITY". Provisional Patent No. 61/195,573 is assigned to the assignee of the present application and is hereby incorporated by reference into the present application as if fully set forth herein. The present application hereby claims priority under 35 U.S.C. §119(e) to U.S. Provisional Patent No. 61/195,573.

TECHNICAL FIELD OF THE INVENTION

The present application relates generally to data communication and, more specifically, to a system and method for implementing a Multicast Broadcast Service in a wireless communications system.

BACKGROUND OF THE INVENTION

Various techniques have been proposed to provide broadcast services within a cellular network. For example, Multimedia Broadcast Multicast Service (MBMS) is a broadcast service that has been proposed for implementation within Global System for Mobile Communications (GSM) and Universal Mobile Telecommunications System (UMTS) cellular networks. MBMS is split into a bearer service and a user service. The bearer service includes a multicast mode and a broadcast mode, and the user service offers a streaming delivery method and a download delivery method. The streaming delivery method can be used for a continuous transmission, such as mobile television (TV) services, and the download method is intended for download-and-play services.

Recently, the Institute of Electrical and Electronics Engineers (IEEE) promulgated a standard (i.e., IEEE 802.16) for local and metropolitan area networks. More specifically, IEEE 802.16e describes requirements for an air interface for fixed and mobile broadband wireless access systems. The Worldwide Interoperability for Microwave Access (WiMAX) forum was formed to promote conformance and interoperability of the IEEE 802.16 standard. In general, technology that conforms to the IEEE 802.16 standard facilitates delivery of last mile wireless broadband access, as an alternative to cable and digital subscriber line (DSL) services. IEEE 802.16 defines a multicast and broadcasting service (MBS) that is implemented in a single frequency network (SFN) configuration, as opposed to a multi-frequency network configuration. As is known, a typical cellular network has employed a number of different channels (frequency bands) to reduce interference between neighboring cells of the cellular network and has reused frequency bands in non-adjacent cells.

IEEE 802.16e, which is based on orthogonal frequency division multiple access (OFDMA), defines a partial use of subcarrier (PUSC) operation mode in which a channel is divided into orthogonal segments each with non-overlapping subcarrier permutations and a full use of subcarrier (FUSC) operation mode in which all subcarriers of a channel overlap. IEEE 802.16e defines a zone of a frame to include a number of contiguous OFDMA symbols in an uplink (UL) or downlink (DL) that use the same operation mode. A DL or UL sub-frame may include one or more zones and may switch between the PUSC and FUSC operation modes between zones. In the PUSC operation mode, neighboring base stations (BSs) may be assigned to different segments to reduce interference between the neighboring BSs. In the FUSC operation mode, all BSs are assigned to use the entire channel.

In order to decode a certain MBS content in IEEE 802.16e MBS service, a mobile station (MS) first decodes DL-MAP that includes DL-MAP-IE( ) or MBS-MAP-IE( ). Either of these Information Element (IE) points are mapped to an MBS-MAP in the MBS time zone within a radio frame. The MBS-MAP includes MBS-DATA-IE( ) that tells the specific location for a MBS content that is of interest to the SS. Thereafter, the SS operates in one of two processes. The SS either locates the next MBS-MAP from the present MBS-MAP directly (i.e., DL-MAP→MBS-MAP→Data→MBS-MAP→Data and so on); or, the SS repeats the original procedure for locating each MBS-MAP (i.e., DL-MAP→MBS-MAP→Data→DL-MAP and so forth).

SUMMARY OF THE INVENTION

A subscriber station capable of multi-broadcast service is provided. The subscriber station includes a receiver configured to receive a downlink frame. The downlink frame includes a superframe control header or a downlink map located in the beginning of a superframe or frame which may not exist for a EMBS-exclusive frequency; an EMBS flag located in the beginning of a superframe or frame, which may not exist for a EMBS-exclusive frequency; an enhanced multi-broadcast service map located in an enhanced multi-broadcast service subframe. The downlink frame also includes a security and data multiplexing burst area, the security data multiplexing burst area is adapted to carry security information. The downlink frame further includes a plurality of multi-broadcast data bursts. The receiver is configured to decode the enhanced multi-broadcast service map to identify locations of at least one of the plurality of enhanced multi-broadcast data bursts.

A wireless communication network comprising a plurality of base stations is provided. At least one of the base stations is capable of providing enhanced multi-broadcast service to a plurality of subscriber stations. The base station includes a transmitter configured to send a downlink frame. The downlink frame includes an enhanced multi-broadcast service map located in an enhanced multi-broadcast service subframe. The enhanced multi-broadcast service map is configured to identify locations of at least one enhanced multi-broadcast data bursts. The downlink frame also includes a security and data multiplexing burst area. The security data multiplexing burst area is adapted to carry security information. The downlink frame further includes a plurality of multi-broadcast data bursts.

A method for providing enhanced multi-broadcast service is provided. The method includes transmitting a downlink frame. The downlink frame includes an enhanced multi-broadcast service map located in an enhanced multi-broadcast service subframe. The enhanced multi-broadcast service map is configured to identify locations of at least one enhanced multi-broadcast data bursts. The downlink frame also includes a security and data multiplexing burst area. The security data multiplexing burst area is adapted to carry security information. The downlink frame further includes a plurality of multi-broadcast data bursts Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications network.

Figure 1:
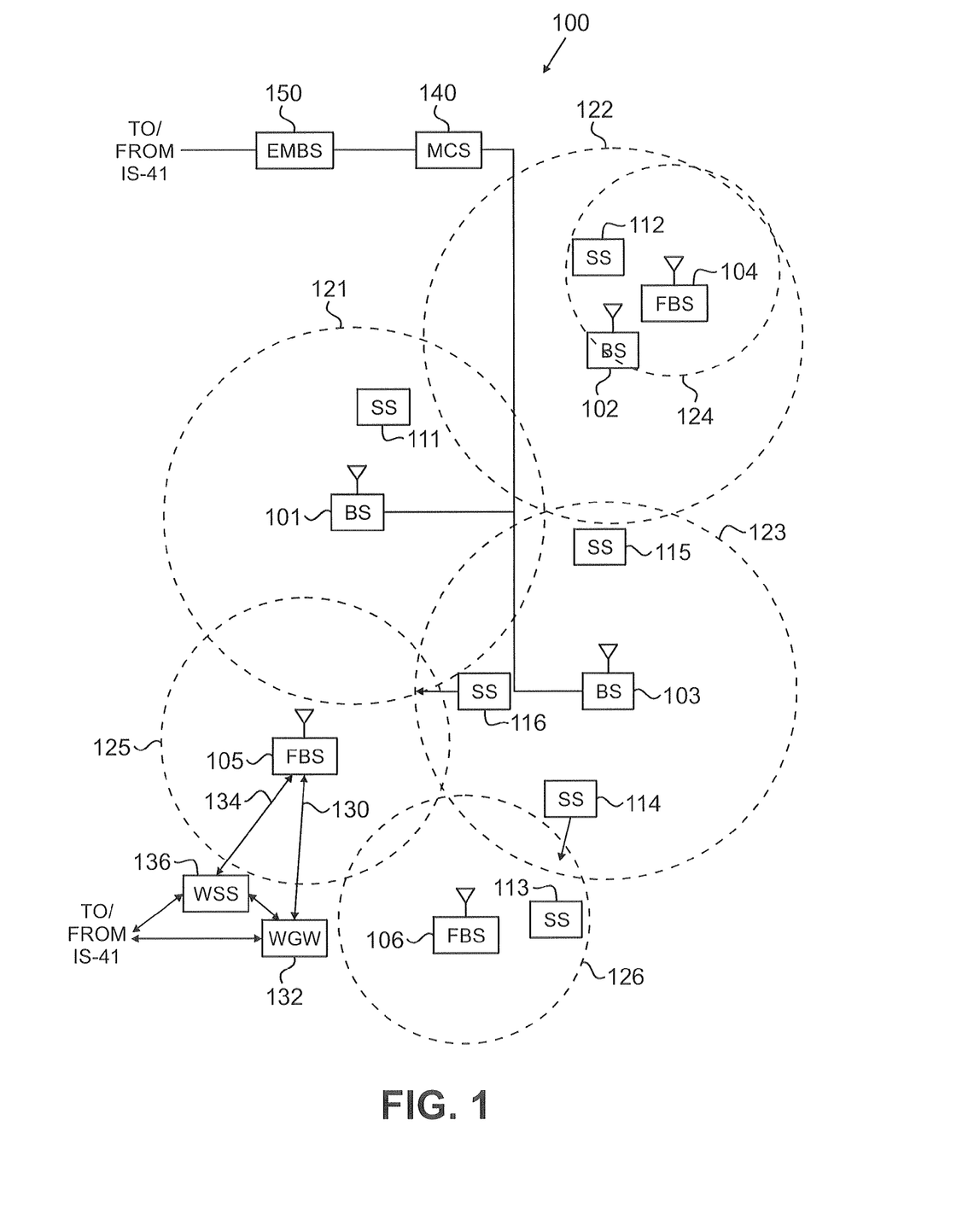
FIG. 1 illustrates exemplary wireless network 100 according to embodiments of the present disclosure.

FIG. 1 illustrates exemplary wireless network 100 according to embodiments of the present disclosure. The embodiment of wireless network 100 illustrated in FIG. 1 is for illustration only. Other embodiments of the wireless network 100 could be used without departing from the scope of this disclosure.

Wireless network 100 comprises a plurality of cells 121-126, each containing one of the Base Stations (BS), BS 101, BS 102, or BS 103 or Femto Base Stations (FBS), FBS 104, FBS 105 or FBS 106. Base stations 101-103 communicate with a plurality of mobile stations (MS) 111-116 over code division multiple access (CDMA) channels), Orthogonal Frequency Division Multiple Access (OFDMA), or any other communications standard as is known in the art. In some embodiments, mobile stations 111-116 are capable of receiving data traffic and/or voice traffic on two or more CDMA channels simultaneously. Mobile stations 111-116 may be any suitable wireless devices (e.g., conventional cell phones, PCS handsets, personal digital assistant (PDA) handsets, portable computers, telemetry devices) that are capable of communicating with base stations 101-103 via wireless links.

Dotted lines show the approximate boundaries of cells 121-123 in which base stations 101-103 are located. The cells are shown approximately circular for the purposes of illustration and explanation only. It should be clearly understood that the cells may have other irregular shapes, depending on the cell configuration selected and natural and man-made obstructions.

As is well known in the art, each of cells 121-123 is comprised of a plurality of sectors, where a directional antenna coupled to the base station illuminates each sector. The embodiment of FIG. 1 illustrates the base station in the center of the cell. Alternate embodiments may position the directional antennas in corners of the sectors. The system of the present disclosure is not limited to any particular cell configuration.

In one embodiment of the present disclosure, each of BS 101, BS 102 and BS 103 comprises a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present disclosure, the base transceiver subsystems in each of cells 121, 122, 123 and the base station controller associated with each base transceiver subsystem are collectively represented by BS 101, BS 102, and BS 103, respectively.

In some embodiments, BS 101, BS 102 and BS 103 transfer voice and data signals between each other and the public switched telephone network (PSTN) (not shown), or any IS-41 communication network as is known in the art, via communication line (not shown) and mobile switching center (MSC) 140. The communication line may be any suitable connection means, including a T1 line, a T3 line, a fiber optic link, a network packet data backbone connection, or any other type of data connection. The communication line links each vocoder in the BSC with switch elements in the MSC 140. The connections on communication line may transmit analog voice signals or digital voice signals in pulse code modulated (PCM) format, Internet Protocol (IP) format, asynchronous transfer mode (ATM) format, or the like.

The MSC 140 is a switching device that provides services and coordination between the subscribers in a wireless network and external networks, such as the IS-41, PSTN, or Internet. The MSC 140 is well known to those skilled in the art. In some embodiments of the present disclosure, communications line may be several different data links where each data link couples one of BS 101, BS 102, or BS 103 to the MSC 140.

The wireless network 100 includes a femto-cell base station 124-126. Each FBS 124-126 includes components analogous to those found in macro base stations BS 101, BS 102 and BS 103. As such, FBS 124, FBS 125 and FBS 126 each comprises a femto base station controller (FBSC) and one or more femto base transceiver subsystem(s) (FBTS). Each of FBS 124, FBS 125 and FBS 126 communicates with mobile stations in its served area using wireless fidelity, IS-95, CDMA or any other cellular communications standard.

Voice and data signals are transferred between the FBS 104, FBS 105 and FBS 106 and the IS-41 network (e.g., PSTN) via communications lines, wireless gateway and wireless soft switches. For example, Voice signals are transferred between the FBS 105 and the IS-41 network via communication line 130, Wireless Gateway (WGW) 132. Data signals are transferred between the FBS 105 and the IS-41 network via communication line 134 and Wireless Soft Switch (WSS) 136. The WGW 132 and WSS 136 are coupled via a backhaul connection (not shown), e.g., the IS-41, to the MSC 140. The WGW 132 provides a bearer path between FBS 105 and the MSC 140 via the IS-41. The WSS 136 provides a signaling path FBS 105 and WGW 132 as well as to the MSC 140 via the IS-41.

A dotted line shows the approximate boundaries of cells 124-126 in which FBS 104, FBS 105 and FBS 106 are located. The cell is shown approximately circular for the purposes of illustration and explanation only. It should be clearly understood that the cell may have an irregular shape, depending on the cell configuration selected and natural and man-made obstructions.

In the exemplary wireless network 100, SS 111 is located in cell 121 and is in communication with BS 101. SS 112 is located in cell 121 and cell 124 and is in communication with BS 102. SS 113 is located in cell 126, is in communication with FBS 106. SS 114 is located in cell 123, is in communication with BS 103 and is moving in the direction of cell 126, as indicated by the direction arrow proximate SS 114. At some point, as SS 114 moves into cell 126 and SS 114 will detect signals from FBS 106. SS 115 is located in cell 123 and is in communication with BS 103. SS 115 also is located close to the edge of cell 122. SS 116 is located in cell 123, is in communication with BS 103 and is moving in the direction of cell 121 and cell 125. At some point, as SS 116 moves into area covered by cell 121 and cell 125, SS 116 will detect signals from BS 102 and FBS 105 and a handoff will occur.

As shown in FIG. 1, SS 112 is located in both cell 122 and cell 124. FBS 104 is a closed FAP. Furthermore, SS 112 has not subscribed to FBS 104. Therefore, SS 112 is not authorized to access FBS 104. Accordingly, SS 112 is not in communication with FBS 104 and is only in communication with BS 102.

Additionally, SS 114 is moving from BS 103 towards FBS 106. FBS 106 is an open FAP. As SS 114 enters cell 126, SS 114 becomes aware of FBS 106 as SS 114 receives signaling from FBS 106. The signaling contains a base station identifier (e.g., base station identity, or some other value) for FBS 106 indicating that FBS 106 is an open FAP. Since FBS 106 is an open FAP, all compatible wireless devices, including SS 114, are authorized to access FBS 106. In some embodiments, a handoff occurs wherein communications between SS 114 and BS 103 are terminated and communications between SS 114 and FBS 106 are established. SS 114 may still be located within cell 123 and in communication with FBS 104.

Furthermore, SS 116 is moving from BS 103 towards FBS 105. FBS 105 is a closed FAP. Therefore, only authorized wireless devices are allowed to access FBS 105. For example, FBS 105 may be located in a Starbucks® and only individuals who have subscribed for access a FAP through Starbuck® are allowed to access FBS 105. A subscriber with SS 116 enters cell 125. SS 116 receives signaling from FBS 105. The signaling includes a Closed Subscriber Group (CSG) Identification (ID) for FBS 105. SS 116 recognizes the CSG ID for FBS 105 and a handoff of SS 116 from BS 103 to FBS 105 occurs.

The network 100 includes an Enhanced-MBS (EMBS) server 150 configured to transmit multi-broadcast server information to one or more subscriber stations via one or more base stations located within an EMBS zone. In some embodiments, the EMBS server 150 is an Multi-Cast Server (MCS) configured to transmit Enhanced multi-broadcast information and content. For example, BS 101-103 and FBS 104-106 may be located in the EMBS zone served by the EMBS server 150 such that the EMBS server 150 is coupled to one or more of BS 101-103 via MSC 140 and FBS 104-106 via the IS-41 network. The EMBS server 150 transmits EMBS MAPs and EMBS data burst to one or more of BS 101-103 and FBS 104-106 for retransmission to one or more of SS 111-116.

MBS as disclosed herein may be implemented in various wireless communications systems. Such systems may include CDMA, Time Division Multiple Access (TDMA), Frequency Division Multiple Access (FDMA), and OFDMA communication systems. CDMA systems may be designed to implement one or more commonly known CDMA standards such as, but not limited to, W-CDMA, IS-95, IS-2000, IS-856, and others.

Figure 2:
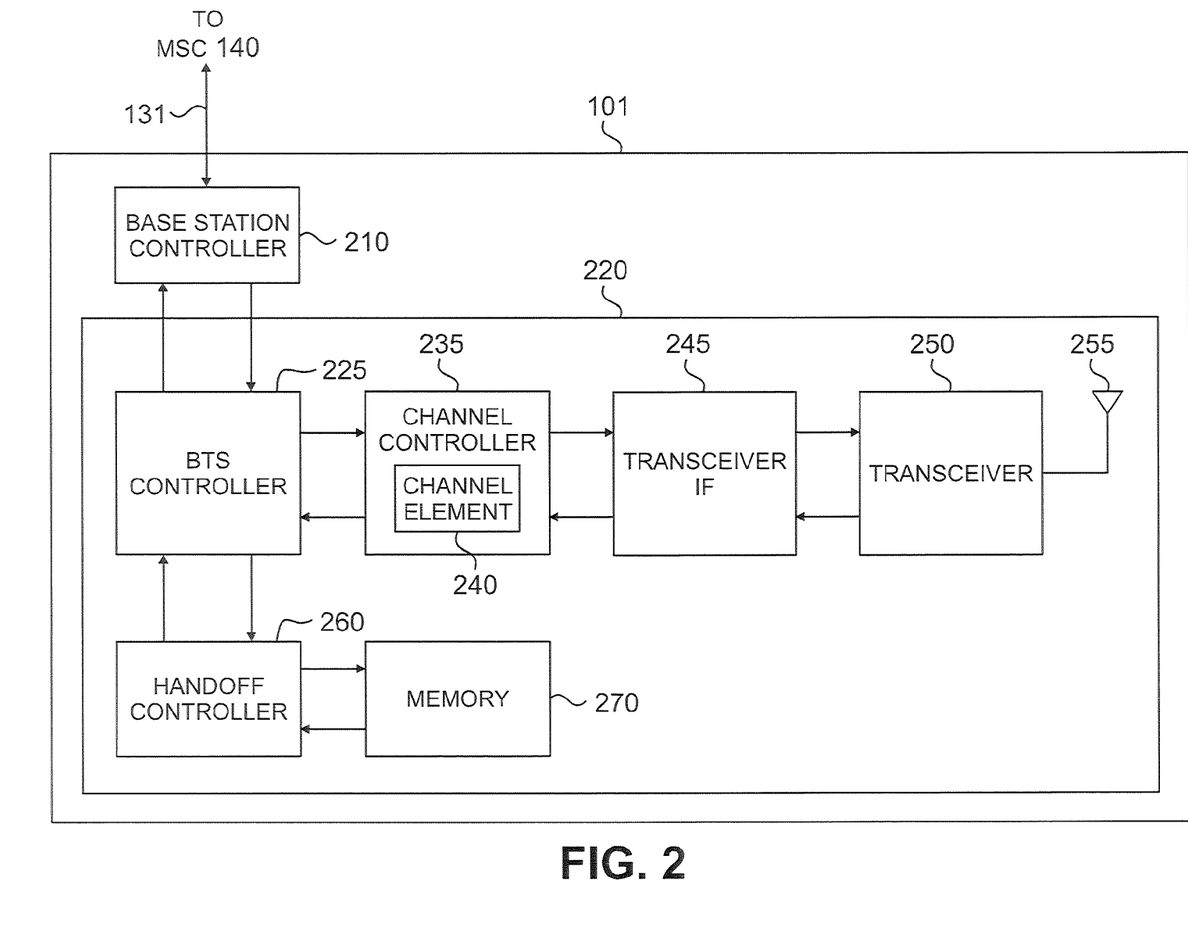
FIG. 2 illustrates exemplary base station 101 in greater detail according to one embodiment of the present disclosure.

FIG. 2 illustrates exemplary base station 101 in greater detail according to one embodiment of the present disclosure. The embodiment of base station 101 illustrated in FIG. 2 is for illustration only. Other embodiments of the base station 101 could be used without departing from the scope of this disclosure. It will be understood that although BS 101 is described for illustration and example only, descriptions can apply to BS 102 and BS 103 equally.

Base station 101 includes base station controller (BSC) 210 and base transceiver subsystem (BTS) 220. Base station controllers and base transceiver subsystems were described previously in connection with FIG. 1. BSC 210 manages the resources in cell site 121, including BTS 220. BTS 220 comprises BTS controller 225, channel controller 235, transceiver interface (IF) 245, RF transceiver unit 250, and antenna array 255. Channel controller 235 comprises a plurality of channel elements, including exemplary channel element 240. BTS 220 also comprises a handoff controller 260. The embodiment of handoff controller 260 and memory 270 included within BTS 220 is for illustration only. Handoff controller 260 and memory 270 can be located in other portions of BS 101 without departing from the scope of this disclosure.

BTS controller 225 includes processing circuitry and memory capable of executing an operating program that communicates with BSC 210 and controls the overall operation of BTS 220. Under normal conditions, BTS controller 225 directs the operation of channel controller 235, which contains a number of channel elements, including channel element 240, that perform bi-directional communications in the forward channels and the reverse channels. A forward channel refers to a channel in which signals are transmitted from the base station to the mobile station. A reverse channel refers to a channel in which signals are transmitted from the mobile station to the base station. In some embodiments, the channel elements communicate according to a code division multiple access (CDMA) protocol with the mobile stations in cell 121. In additional and alternative embodiments, the channel elements communicate according to a OFDMA protocol with the mobile stations in cell 121. Transceiver IF 245 transfers the bi-directional channel signals between channel controller 240 and RF transceiver unit 250.

Antenna array 255 transmits forward channel signals received from RF transceiver unit 250 to mobile stations in the coverage area of BS 101. Antenna array 255 also sends to transceiver 250 reverse channel signals received from mobile stations in the coverage area of BS 101. In some embodiments, antenna array 255 is a multi-sector antenna, such as a three-sector antenna in which each antenna sector is responsible for transmitting and receiving in a 120° arc of coverage area. Additionally, RF transceiver 250 may contain an antenna selection unit to select among different antennas in antenna array 255 during transmit and receive operations.

According to some embodiments, handoff controller 260 is capable of determining a list of candidate target base stations for handoff. Handoff controller 260 is configured to dynamically adjust a threshold parameter used in inter-frequency (i.e., different frequency) hard handoffs. Handoff controller 260 also is configured to dynamically adjust the threshold parameter used in intra-frequency (i.e., same frequency) hard handoffs. Handoff controller 260 is operable to store the threshold parameters and list of candidate target base stations in a memory 270.

Memory 270 can be any computer readable medium, for example, the memory 270 can be any electronic, magnetic, electromagnetic, optical, electro-optical, electro-mechanical, and/or other physical device that can contain, store, communicate, propagate, or transmit a computer program, software, firmware, or data for use by the microprocessor or other computer-related system or method. Memory 270 comprises a random access memory (RAM) and another part of memory 270 comprises a Flash memory, which acts as a read-only memory (ROM).

Figure 3:
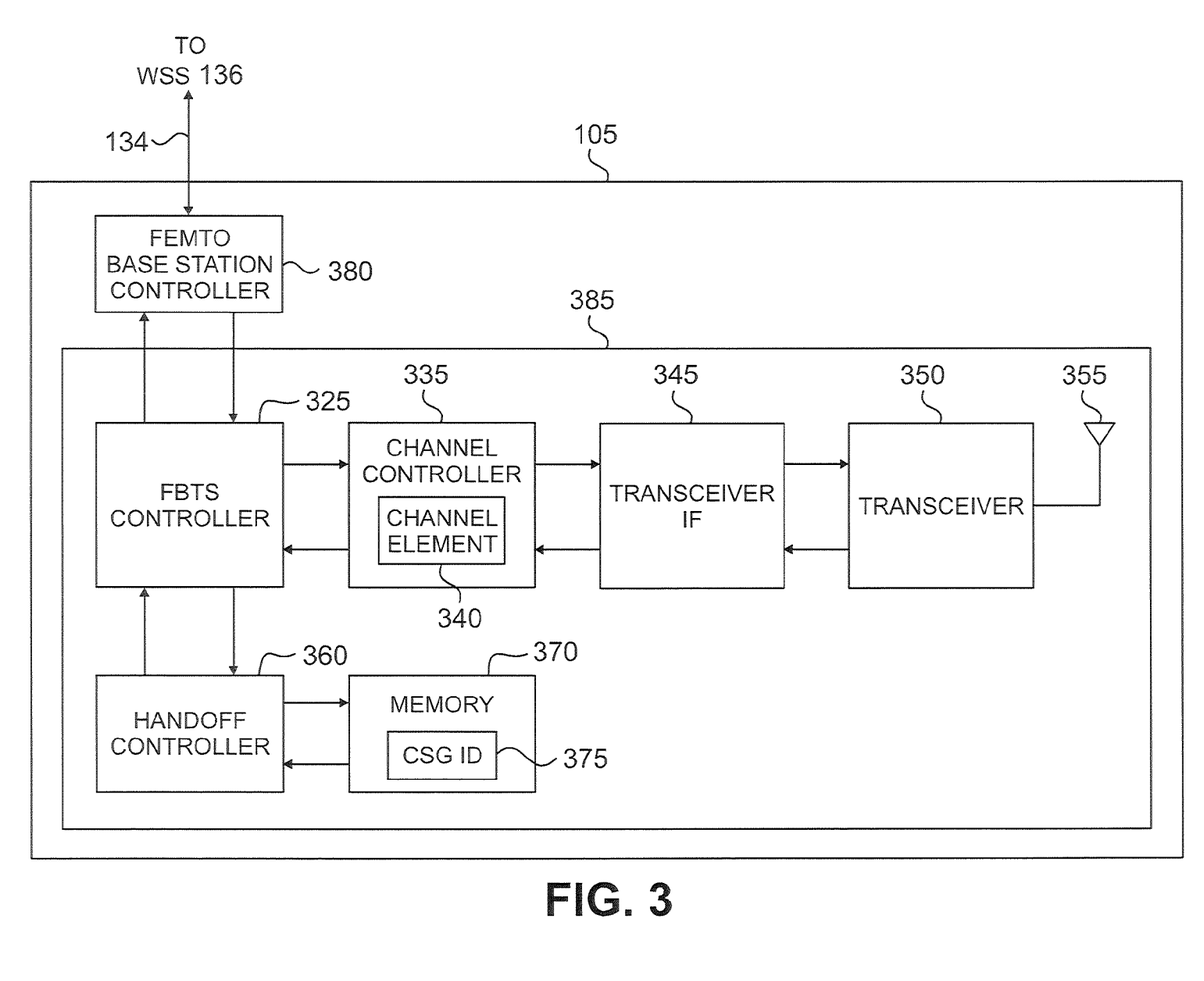
FIG. 3 illustrates exemplary femto base station 105 in greater detail according to one embodiment of the present disclosure.

FIG. 3 illustrates exemplary femto base station 105 in greater detail according to one embodiment of the present disclosure. The embodiment of femto base station 105 illustrated in FIG. 3 is for illustration only. Other embodiments of the femto base station 105 could be used without departing from the scope of this disclosure. It will be understood that although FBS 105 is described for illustration and example only, descriptions can apply to FBS 104 and FBS 106 equally.

Femto base station 105 includes femto base station controller (FBSC) 380 and femto base transceiver subsystem (FBTS) 385. Femto base station controllers and femto base transceiver subsystems were described previously in connection with FIG. 1. FBTS 385 also includes a handoff controller 360. The embodiment of the handoff controller 360 and memory 370 included within FBTS 385 is for illustration only. Handoff controller 360 and memory 370 can be located in other portions of FBS 105 without departing from the scope of this disclosure.

FBSC 380 includes processing circuitry and memory capable of executing an operating program that controls the overall operation of FBTS 385. Under normal conditions, FBSC 380 directs the operation of channel controller 335, which contains a number of channel elements, including channel element 340, that perform bi-directional communications in the forward channels and the reverse channels. A forward channel refers to a channel in which signals are transmitted from the femto base station to the mobile station. A reverse channel refers to a channel in which signals are transmitted from the mobile station to the femto base station. Transceiver IF 345 transfers the bi-directional channel signals between channel controller 340 and RF transceiver unit 350.

Antenna array 355 transmits forward channel signals received from RF transceiver unit 350 to mobile stations in the coverage area of FBS 105. Antenna array 355 also sends to transceiver 350 reverse channel signals received from mobile stations in the coverage area of FBS 105. In a preferred embodiment of the present disclosure, antenna array 355 is a multi-sector antenna, such as a three-sector antenna in which each antenna sector is responsible for transmitting and receiving in a 120° arc of coverage area. Additionally, RF transceiver 350 may contain an antenna selection unit to select among different antennas in antenna array 355 during transmit and receive operations.

Memory 370 can be any computer readable medium, for example, the memory 370 can be any electronic, magnetic, electromagnetic, optical, electro-optical, electro-mechanical, and/or other physical device that can contain, store, communicate, propagate, or transmit a computer program, software, firmware, or data for use by the microprocessor or other computer-related system or method. Memory 370 comprises a random access memory (RAM) and another part of memory 370 comprises a Flash memory, which acts as a read-only memory (ROM).

One or more of BS 101 and FBS 105 broadcasts MBS content to one or more subscriber stations. The base stations, e.g., BS 101 and FBS 105, are configured to include MBS content in one or more radio frames transmitted to the subscriber stations.

Figure 4:
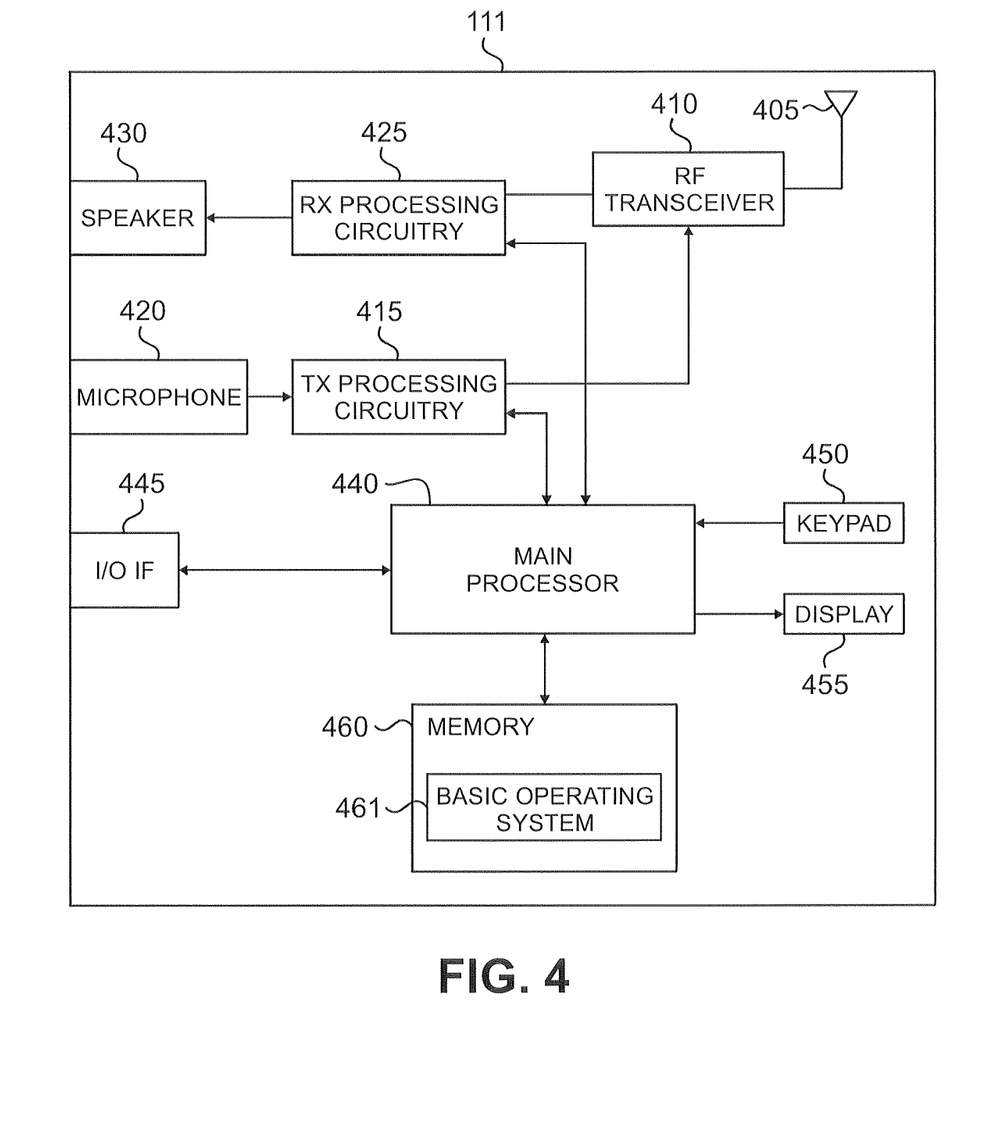
FIG. 4 illustrates wireless subscriber station 111 according to embodiments of the present disclosure.

FIG. 4 illustrates wireless subscriber station 111 according to embodiments of the present disclosure. The embodiment of wireless subscriber station 111 illustrated in FIG. 4 is for illustration only. Other embodiments of the wireless subscriber station 111 could be used without departing from the scope of this disclosure. It will be understood that although SS 111 is described for illustration and example only, descriptions can apply to SS 112-116 equally.

Wireless subscriber station 111 includes antenna 405, radio frequency (RF) transceiver 410, transmit (TX) processing circuitry 415, microphone 420, and receive (RX) processing circuitry 425. SS 111 also includes one or more speakers 430, main processor 440, input/output (I/O) interface (IF) 445, keypad 450, display 455, and memory 460. Memory 460 further includes basic operating system (OS) program 461.

Radio frequency (RF) transceiver 410 receives from antenna 405 an incoming RF signal transmitted by a base station (e.g., either a base station or femto base station) of wireless network 100. Radio frequency (RF) transceiver 410 down-converts the incoming RF signal to produce an intermediate frequency (IF) or a baseband signal. The IF or baseband signal is sent to receiver (RX) processing circuitry 425 that produces a processed baseband signal by filtering, decoding, and/or digitizing the baseband or IF signal. Receiver (RX) processing circuitry 425 transmits the processed baseband signal to speaker 430 (i.e., voice data) or to main processor 440 for further processing (e.g., MBS or web browsing).

Transmitter (TX) processing circuitry 415 receives analog or digital voice data from microphone 420 or other outgoing baseband data (e.g., web data, e-mail, interactive video game data) from main processor 440. Transmitter (TX) processing circuitry 415 encodes, multiplexes, and/or digitizes the outgoing baseband data to produce a processed baseband or IF signal. Radio frequency (RF) transceiver 410 receives the outgoing processed baseband or IF signal from transmitter (TX) processing circuitry 415. Radio frequency (RF) transceiver 410 up-converts the baseband or IF signal to a radio frequency (RF) signal that is transmitted via antenna 405.

In some embodiments of the present disclosure, main processor 440 is a microprocessor or microcontroller. Memory 460 is coupled to main processor 440. According to some embodiments, part of memory 460 comprises a random access memory (RAM) and another part of memory 460 comprises a Flash memory, which acts as a read-only memory (ROM).

Main processor 440 executes basic operating system (OS) program 461 stored in memory 460 in order to control the overall operation of wireless subscriber station 111. In one such operation, main processor 440 controls the reception of forward channel signals and the transmission of reverse channel signals by radio frequency (RF) transceiver 410, receiver (RX) processing circuitry 425, and transmitter (TX) processing circuitry 415, in accordance with well-known principles.

Main processor 440 is capable of executing other processes and programs resident in memory 460. Main processor 340 can move data into or out of memory 460, as required by an executing process. Main processor 440 is also coupled to I/O interface 445. I/O interface 445 provides subscriber station 111 with the ability to connect to other devices such as laptop computers and handheld computers. I/O interface 445 is the communication path between these accessories and main controller 440.

Main processor 440 is also coupled to keypad 450 and display unit 455. The operator of subscriber station 111 uses keypad 450 to enter data into subscriber station 111. Display 455 may be a liquid crystal display capable of rendering video, text and/or at least limited graphics from web sites. Alternate embodiments may use other types of displays.

Received MBS content includes at least video and audio. Main processor 440 is configured to cause MBS video to be presented on display 455 and MBS audio to be output from one or more speakers 430.

Figure 5:
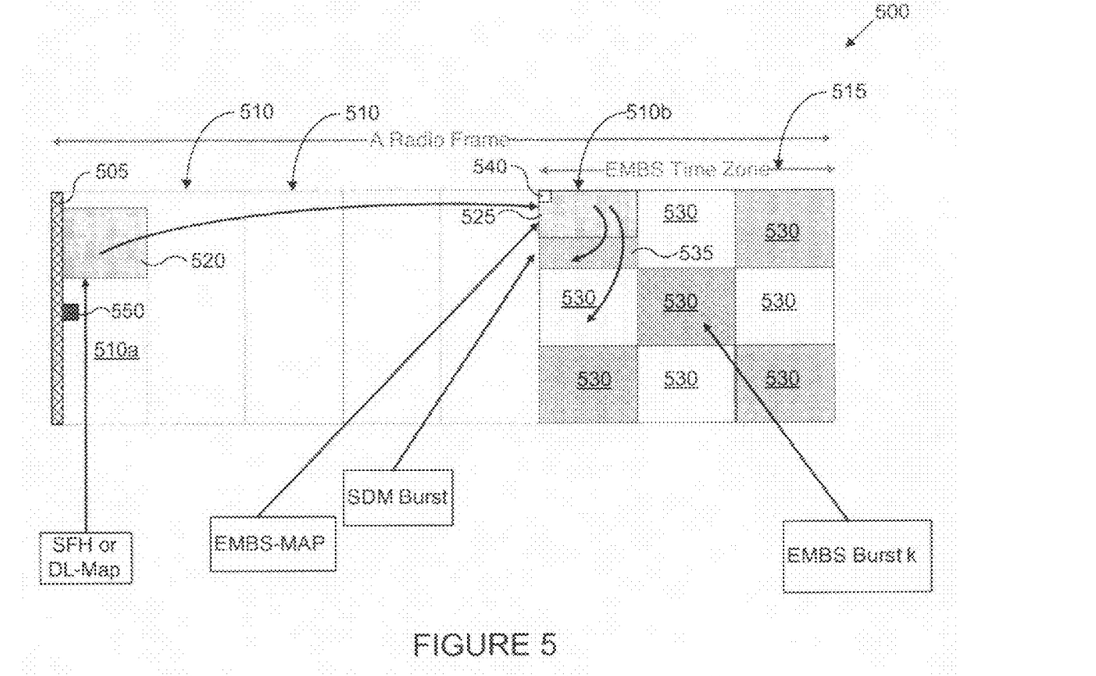
FIG. 5 illustrates an exemplary radio frame including Enhanced-MBS (EMBS) control mapping and EMBS content according to embodiments of the present disclosure.

FIG. 5 illustrates an exemplary radio frame including Enhanced-MBS (EMBS) control mapping and EMBS content according to embodiments of the present disclosure. The embodiment of the radio frame 500 shown in FIG. 5 is for illustration only. Other embodiments could be used without departing from the scope of this disclosure.

The radio frame 500 includes a preamble 505. The preamble 505 is configured to signify the beginning of the radio frame. The radio frame 500 is comprised of a number of sub-frames 510. The preamble 505 can occupy an entire frequency band of one or more of the first symbols of a particular sub-frame 510a or the preamble 505 can occupy a portion of the frequency band of one or more of the first symbols of the sub-frame 510a. One or more of the sub-frames form an EMBS Time-Zone 515. The radio frame 500 includes a downlink control signaling 520, such as, but not limited to, a Superframe Control Header (SFH), superframe control signaling, and a DL-MAP. Hereinafter, a DL-MAP 520 will be illustrated for example purposes. The radio frames also includes an EMBS-Map 525 located in the EMBS-Time-Zone 515. The EMBS Time-Zone 515 includes EMBS content. The EMBS content is transmitted in EMBS bursts 530. In some embodiments, the EMBS Time-Zone 515 includes a Security Data Multiplexing (SDM) burst 535. The EMBS MAP 525 points to the SDM burst 535 when an SDM burst 535 is transmitted. The SDM burst 535 includes security information that a subscriber station (e.g., SS 111) needs to decode EMBS data bursts 530. The SDM burst 535 may not be included in every radio frame 500; rather the SDM burst 535 may be present in a single radio frame 500 or be transmitted in select radio frames 500 periodically or non-periodically. When the SDM burst 535 is not transmitted, the area that would otherwise have been used by the SDM burst 535 is used for additional EMBS data bursts 530.

A base station, e.g., BS 101, transmits one or more radio frames 500 to a subscriber station, e.g., SS 111. It will be understood that BS 101 and SS 111 are described for illustration and example only and the descriptions herein equally apply to the other base stations, such as BS 102-103 or FBS 104-106, and other subscriber stations, such as SS 112-116. BS 101 can transmit multiple radio frames 500 as part of a superframe (discussed in further detail herein below with respect to FIG. 6).

The broadcasted DL-MAP Media Access Control (MAC) management message defines the access to the downlink information. The DL-MAP 520 is a MAC management message that defines burst start times on the downlink carrier. The DL-MAP 520 is a directory, broadcasted by BS 101, of downlink frames.

For OFDM and OFDMA (or both WiMAX) Physical (PHY) layers, access grants of DL-MAP 520 are in units of symbols and (for OFDMA) subchannels. Timing information in the DL-MAP 520 is relative. The time instant used as references for timing information for the DL-MAP 520 is the start of the first symbol (including the preamble 505 if present) of the frame 500 in which the message was transmitted. Information in the DL-MAP 520 is about the current frame (the frame 500 in which the DL-MAP 520 message is sent). Each burst start time is indicated by a DL-MAP Information Elements (DL-MAP_IE). The DL-AMP_IE format is PHY layer-dependent. The start time included in the DL MAP indicates the start time, in units of OFDM symbol duration or units of sub-frames dependent on the standards, relative to the start of the first symbol or the first subframe of the Frame (including the preamble) where the DL-MAP 520 message is transmitted. The time instant indicated by the Start Time value is the transmission times of the first symbol of the burst including the preamble (if present). The end of the last allocated burst is indicated by allocating an End of Map burst with zero duration.

The DL MAP 520 is configured to direct MS 111 where in the radio frame 500 the EMBS Zone 515 and the EMBS MAP 525 are located. The DL-MAP 520 occupies a portion of one sub-frame 510. For example, DL-MAP 520 can be transmitted using multiple symbols, or sub-channels, in the first sub-frame 510a. The DL-MAP 520 points main processor 440 in SS 111 where the EMBS-MAP 525 is located in the frame 500.

As mentioned before, instead of using DL-MAP, the location of EMBS-MAP could also be indicated by a certain field in the superframe control header (SFH) or a system information block (SIB), which may be located in the center of the frequency band.

The EMBS-MAP 525 directs SS 111 where the EMBS bursts 530 are located in the EMBS Time-Zone 515 within the radio frame 500. The EMBS-MAP 525, for OFDM and OFDMA (or both WiMAX) Physical (PHY) layers, access grants are in units of symbols and/or (for OFDMA) subchannels. Timing information in the EMBS-MAP 525 is relative. The time instant used as references for timing information for the EMBS-MAP 525 is the start of the first symbol of the EMBS Time-Zone 515 in which the message was transmitted. In some embodiments, the time information in the EMBS-MAP 525 is the start of the first symbol of the radio frame. Information in the EMBS-MAP 525 is about the current EMBS Time-Zone 515 (the EMBS Time-Zone 515 in which the EMBS-MAP 525 message is located). Each EMBS burst 530 start time is indicated by an EMBS-MAP 525 Information Elements (EMBS-MAP_IE). The EMBS-AMP_IE format is PHY layer-dependent. The start time included in the EMBS-MAP 525 indicates the start time, in units of OFDM symbol duration, relative to the start of the first symbol of the EMBS Time-Zone 515 in which EMBS-MAP 525 is located. The time instant indicated by the Start Time value is the transmission times of the first symbol of the burst. The end of the last allocated burst is indicated by allocating an End of Map burst with zero duration.

Accordingly, the DL-MAP 520 points to the location of the EMBS-MAP 525 in the EMBS subframe 510*b*. The EMBS subframe 510*b* can be one of multiple subframes 510 in the EMBS Time-Zone 515 or the EMBS subframe 510*b* can be the only subframe 510 in the EMBS Time-Zone 515. The EMBS Subframe 510*b* contains the EMBS MAP 525, the SDM burst 535 followed by the EMBS data bursts 530 for each MBS content. Each EMBS data burst 530 corresponds to an EMBS content ID. In some embodiments, the EMBS MAP 525 includes a counter 540 (discussed in further detail herein below with respect to FIG. 9).

In some embodiments, the DL-MAP 520 also points to the next DL-MAP 520 in the next radio frame 500. Each subsequent DL-MAP 520 points to a corresponding EMBS MAP 525 in the same radio frame 500. In additional and alternative embodiments, a single DL-MAP 520 points to multiple EMBS MAPS 525 in multiple radio frames 500.

Figure 6:
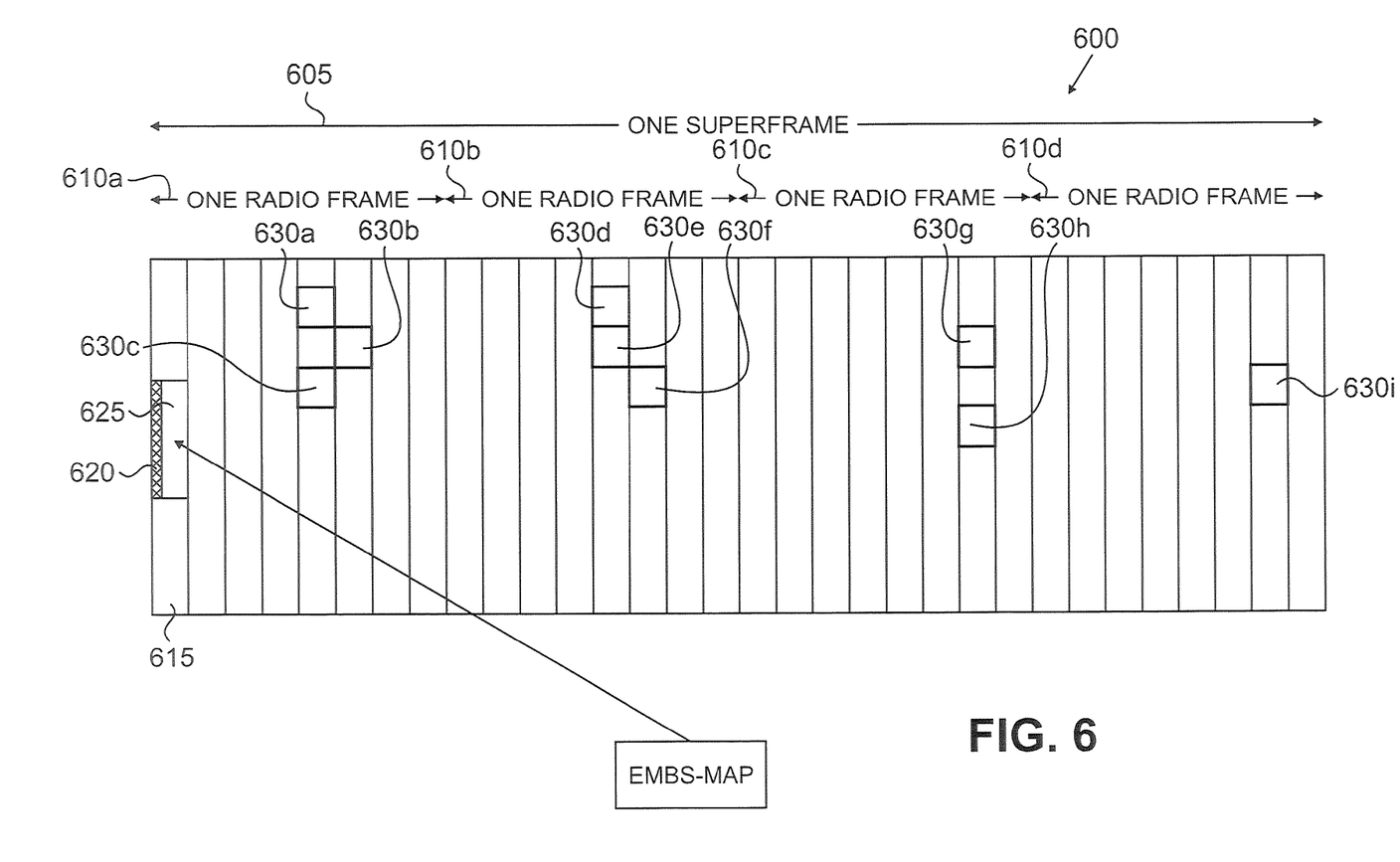
FIG. 6 illustrates an exclusive EMBS frame structure according to embodiments of the present disclosure.

FIG. 6 illustrates an exclusive EMBS frame structure according to embodiments of the present disclosure. The embodiment of exclusive EMBS (e.g., EMBS-Only) frame 600 shown in FIG. 6 is for illustration only. Other embodiments could be used without departing from the scope of this disclosure.

In some embodiments, the frame structure is configured to be used with EMBS dedicated carriers. The E-BS dedicated carriers use an exclusive EMBS frame 600 that is useful when the entire carrier is used for EMBS without a unicast service. The exclusive EMBS frame 600 broadcasts only the controlling signal related to EMBS. Therefore, the DL-MAP 520 and other overhead that is related to unicast service is removed.

The exclusive EMBS frame 600 includes a superframe 605 comprised of a plurality of radio frames 610 and a preamble 620. Each radio frame 610 includes a plurality of sub-frames 615. The exclusive EMBS frame 600 includes an EMBS MAP 625. The EMBS MAP 625 can be of the same structure and functionality as the EMBS MAP 525 (discussed in further detail with respect to FIG. 5).

The EMBS MAP 625 points to EMBS data 630 occurring in each radio frame 610 in the entire superframe 605. For example, the EMBS MAP 625 points to EMBS data bursts 630*a-c* in radio frame 610*a*; EMBS data bursts 630*d-f* in radio frame 610*b*; EMBS data bursts 630*g-h* in radio frame 610*c*; and EMBS data burst 630*i* in radio frame 610*d*. Alternatively, EMBS-MAP 625 could exist in the beginning of each radio frame 610.

The following descriptions in apply for both the exclusive EMBS frame 600 and EMBS/Unicast mixed frame 500. A difference between the exclusive EMBS frame 600 and EMBS/Unicast mixed frame 500 is that no DL-MAP is present in exclusive EMBS frame 600.

In some embodiments, an EMBS-flag 550 is included in the in the superframe based control signaling (e.g., SFH). The EMBS-flag can be a one-bit field within the superframe based control signaling. For example, in the event that the EMBS-flag is of positive value, the entire frame is for EMBS only and no unicast controlling signal is carried in this frame. Therefore, the exclusive EMBS frame 600 is used. Otherwise, the frame is a regular unicast frame and the EMBS/Unicast mixed frame 500 is used.

Figure 7:
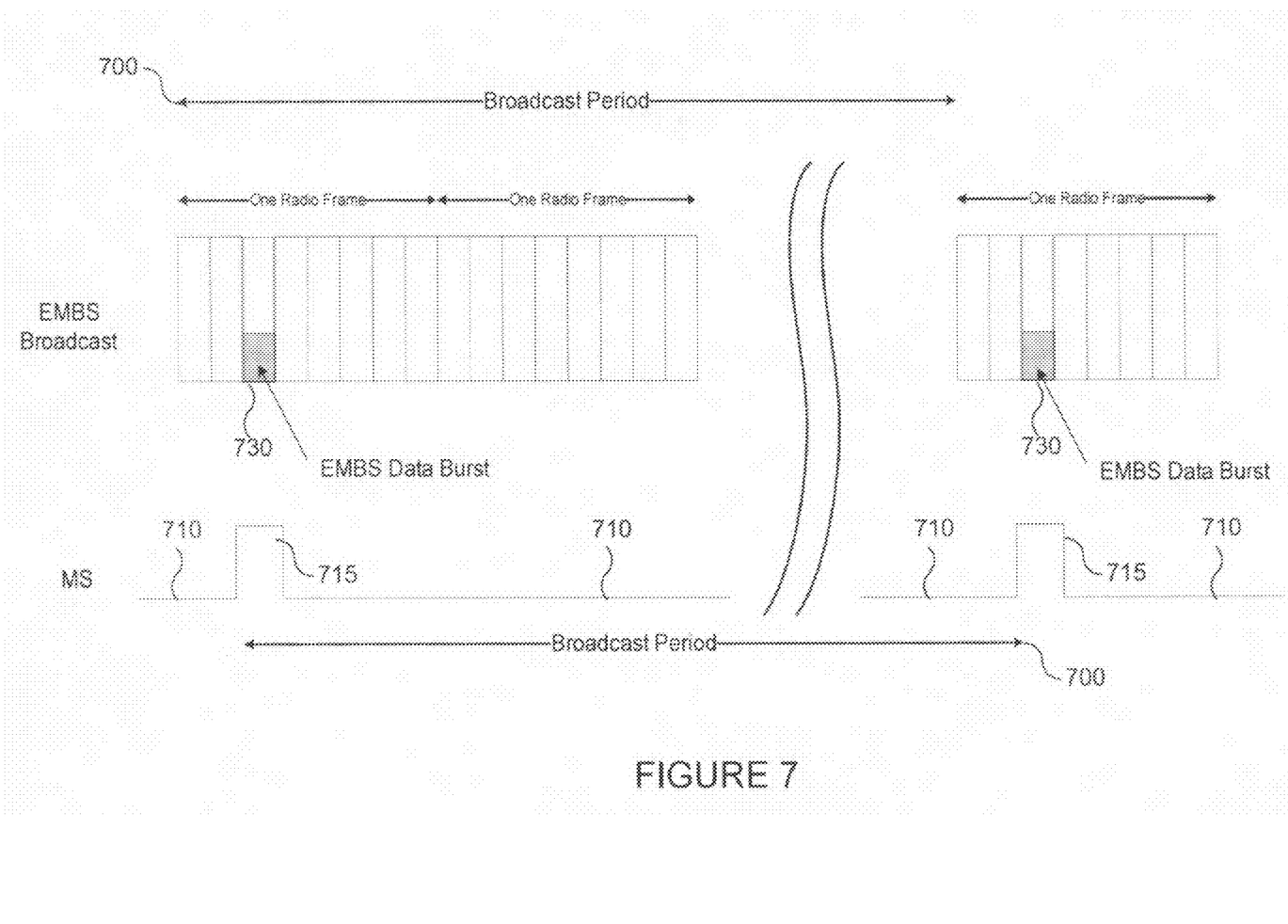
FIG. 7 illustrates an EMBS power saving mode according to embodiments of the present disclosure.

FIG. 7 illustrates an EMBS power saving mode according to embodiments of the present disclosure. The embodiment of the EMBS power saving mode shown in FIG. 7 is for illustration only. Other embodiments could be used without departing from the scope of this disclosure.

In some embodiments, the radio frame (e.g., EMBS/Unicast mixed frame 500 and/or exclusive EMBS frame 600) is configured for minimum power consumption. SS 111 decodes only a specific EMBS data burst 730 during a majority of the time when the user is watching a certain EMBS program.

SS 111 decodes an EMBS MAP (525 shown in FIG. 5 or 625 shown in FIG. 6) in a broadcast period 700. SS 111 may first have decoded a DL-MAP 520 in order to decode the EMBS MAP 525 in an EMBS/Unicast mixed frame 500, or SS 111 may have decoded an EMBS MAP 625 at the start of an exclusive EMBS frame 600. Once SS 111 has decoded the EMBS MAP for the first time, SS 111 is not required to decode the EMBS MAP each time. Instead, SS 111 is idle 710 (e.g., powers down, hibernates, or sleeps) and wakes up 715 only to receive the data burst at the times indicated in the EMBS MAP. SS 111 may also wake up in a few other times in order to maintain the synchronization with the BS 101.

Therefore, SS 111 may wake up only once in each broadcast period 700 in order to decode the data burst 730. As a result, a power saving can be dramatically improved in the EMBS service. Further, in the event that a data burst 730 CRC check fails, then SS 111 first tries to find an EMBS-MAP. In the event that the EMBS-MAP 525 or 625 is in the same sub-frame but a different (e.g., new) location as the data burst 730, SS 111 decodes the EMBS-MAP 525 or 625 from the buffered data and then finds the location of its desired burst 730, and continues looking for data in the new location.

Figure 8:
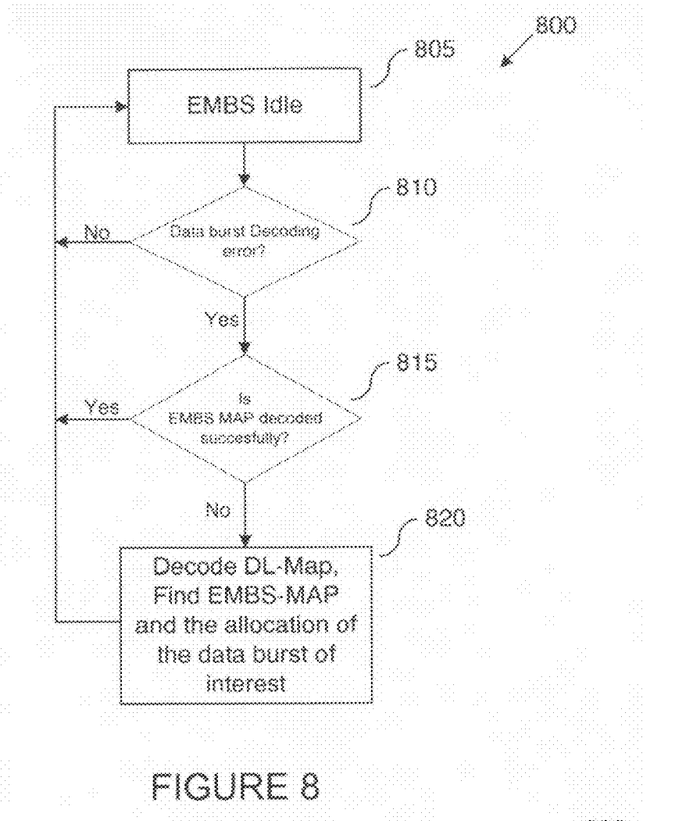
FIG. 8 illustrates direct link adaptation according to embodiments of the present disclosure.

FIG. 8 illustrates direct link adaptation according to embodiments of the present disclosure. The embodiment of the direct link adaptation 800 shown in FIG. 8 is for illustration only. Other embodiments could be used without departing from the scope of this disclosure.

SS 111 is in an idle mode 805. EMBS Server 150, via BS 101, transmits an EMBS MAP and EMBS broadcast data referenced by the EMBS MAP. SS 111 previously decoded the EMBS MAP and wakes up at specified times to receive the EMBS data bursts.

After receiving an EMBS data burst, SS 111 determines, in step 810, if the decoding error occurred with respect to the data burst. For example, the BS may have changed the data burst from the location prescribed by the previously decoded EMBS MAP. Additionally, the data burst may be corrupted due to interference, shadowing and/or fading and SS 111 could not decode it successfully even though the data is still transmitted in the same location prescribed by the previously decoded EMBS MAP.

In the event that SS 111 determines that no decoding error exists in step 810, the SS 111 returns to the idle mode in step 805 until the start of the next data burst prescribed by the previously decoded EMBS MAP. For example, when SS 111 wakes up and successfully receives and reads an EMBS data burst, SS 111 then returns to idle (e.g., power's down, hibernates or sleeps).

In the event that SS 111 determines that an error occurred in step 810, SS 111 proceeds to decode another (e.g., subsequent) EMBS MAP. For example, if the EMBS server 150 has changed the transmission parameters such as Multicast Server (MCS), repetition, burst allocation, and the like, SS 111 would detect error in decoding the present EMBS data burst. SS 111 wakes up to receive and decode the present EMBS data burst but is unable to do so due to the error. SS 111 attempts to resynchronize with the EMBS transmission and resume the EMBS service by trying to decode the EMBS-MAP and finding out the present EMBS transmission parameters at the beginning of the next EMBS time zone, assuming the allocation of the EMBS time zone has not changed.

Having found the next EMBS MAP in step 810, and having found the location of the EMBS data burst of interest, if SS 111 is able to find the location of the EMBS data burst of interest in step 815, then, SS 111 returns to idle mode in step 805. However, in the event that SS 111 is unable to locate and/or decode the EMBS MAP in step 815 or otherwise unable to locate the EMBS data burst of interest, SS 116 reads the DL MAP in step 825. For the unicast/EMBS mixed case, the EMBS time zone may change. If that is the case and SS 111 has error decoding the EMBS-MAP, SS 111 further attempts to resynchronize with the EMBS transmission and resume the EMBS service starting from the DL-MAP in the unicast service. SS 111 reads the DL-MAP received in a subsequent frame or SS 111 may be able to read a DL-MAP in the current frame. SS 111 reads the DL-MAP to determine when the location of the next EMBS MAP. Once the next EMBS MAP is received, read and decoded, SS 111 determines the allocation of the EMBS data burst of interest. Thereafter, SS 111 returns to idle mode in step 805.

In some embodiments, SS 111 decode one data burst at a time. In some embodiments, SS 111 is configured to buffer a radio frame. In such embodiments, if it fails to decode the data burst in step 810, SS 111 first reads either the EMBS MAP or DL-MAP, from the buffered frame in order to find the location of the data burst of interest.

Figure 9:
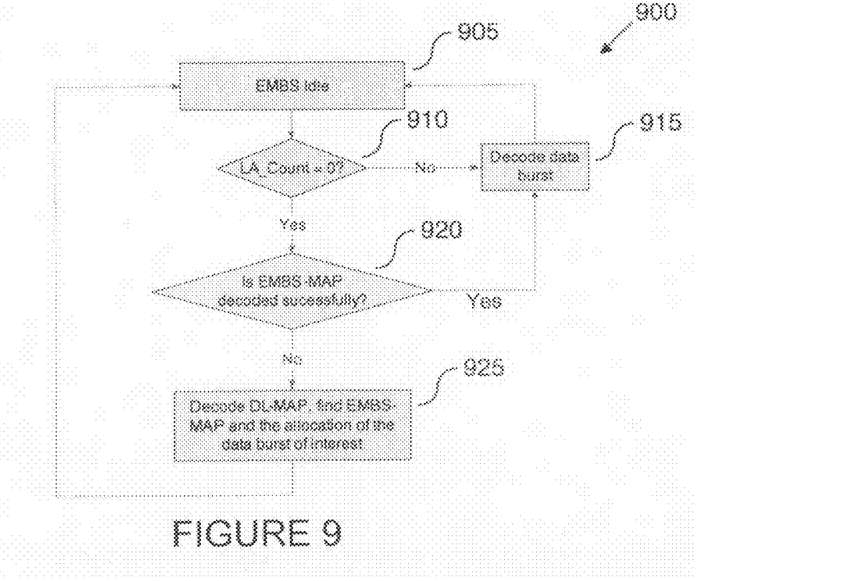
FIG. 9 illustrates predictive adaptation according to embodiments of the present disclosure.

FIG. 9 illustrates predictive adaptation according to embodiments of the present disclosure. The embodiment of the predictive adaptation 900 shown in FIG. 9 is for illustration only. Other embodiments could be used without departing from the scope of this disclosure.

In some embodiments, the EMBS-MAP indicates an updating cycle of the Multi-broadcast Single Frequency Network (MBSFN) configuration parameters. SS 111 includes a counter parameter stored in memory 460. SS 111 and the EMBS server 150 are configured to use an EMBS MAP for a specified duration (e.g., a specified number of cycles) then the EMBS server 150 transmits a new EMBS MAP with a new allocation of the EMBS data bursts. SS 111 decodes EMBS data burst directly with each updating cycle, but also decodes the EMBS-MAP at the beginning of each updating cycle and adapts to the new MBSFN configuration parameters if changed.

SS 111 is in an idle mode 905. EMBS Server 150, via BS 101, transmits an EMBS MAP and EMBS broadcast data referenced by the EMBS MAP. SS 111 previously decoded the EMBS MAP and wakes up at specified times to receive the EMBS data bursts. Further, LA_Count is included in the EMBS-MAP.

After waking up to receive an EMBS data burst, SS 111 determines if a new EMBS MAP needs to be decoded to determine a new allocation for the EMBS data burst of interest. In step 910, the main processor 440 for SS 111 reads the counter parameter (e.g. LA_Count) to determine if a new EMBS MAP needs to be decoded. For example, if LA_Count>0, then the main processor 440 determines that a new EMBS MAP does not need to be decoded. Then SS 111 proceeds to decode the EMBS data burst in step 920. The EMBS transmission parameters will not change unless LA_Count equals zero. Therefore, SS 111 decode just the data burst during times when LA_Count does not equal zero. However, in the event that LA_Count=0, then SS 111 moves to step 920.

In step 910, SS 111 proceeds to read and decode the EMBS data burst in step 915 if LA_Count is larger than zero. When moving from step 910 to step 915, the main processor 440 also decreases the counter parameter, LA_Count, by one and stores the new counter parameter in memory 460. For example, if counter parameter previously was '5' (e.g., LA_Count=5) the main processor 440 stores the counter parameter as '4' (e.g., LA_Count=4) in memory 460. In other words, SS 111 does not have to read EMBS-MAP each time to learn the value of LA_Count. SS 111 reads LA_Count once, and deducts LA_Count by one at each EMBS-MAP broadcast period, which does not have to be equal with the broadcast period of the EMBS program the MS is receiving. Thereafter SS 111 returns to idle mode in step 905.

In step 910, SS 111 proceeds to step 920 if LA_Count equal zero. In step 920, SS 111 determines if the next EMBS MAP is successfully decoded. If the next EMBS MAP is decoded successfully, the next EMBS MAP contains a new counter parameter. SS 111 stores the new counter parameter in memory 460 and proceeds to step 915 to decode the EMBS data burst.

In the event that the EMBS MAP is not decoded successfully in step 920, then SS 111 proceeds to step 925. In step 925, SS 111 decodes the DL-MAP in order to find the next EMBS MAP and the allocation of the EMBS data burst of interest.

The EMBS server may have to change the EMBS parameter before LA_Count reduces to zero, in which case the EMBS server will just change the EMBS parameter and reset LA_Count to zero. In this case, SS 111 may not decode its data burst correctly even though LA_Count is still larger than zero at the SS side. This will fall back to the procedure described in FIG. 8, where SS 111 finds this new EMBS-MAP as well as the allocation of its data burst. Therefore, FIG. 9 and FIG. 8 may be used together for support the re-synchronization of SS 111 with the BS.

In some embodiments, the EMBS server 150 uses a spectrum-efficient EMBS MAP design. Many EMBS programs may have similar transmission requirements. For example, all the TV channels could occupy same amount of radio resources. In some such embodiments, the EMBS-MAP is designed in such a way that only a minimum number of bytes is used in order to achieve spectrum efficiency.

Besides other needed fields, Table 1 illustrates an exemplary EMBS MAP according to embodiments of the present disclosure. The embodiment shown in Table 1 is for illustration only and other embodiments could be used without departing from the scope of this disclosure. The EMBS-MAP includes the following essential fields:

TABLE 1

EMBS-MAP Format

| Syntax | Size (bit) | Notes |
|---|---|---|
| LA_Count | Variable | Link Adaptation Count. EMBS transmission parameters may change when LA_Count equals zero |
| SDM_Burst | Variable | Security and Data multiplexing Burst. For example, if SDM_Burst = 00, there is no SDM_Burst. Otherwise, the value of SDM_Burst tells the size of this burst. SDM_Burst starts at the end of EMBS-MAP. |

TABLE 1-continued

EMBS-MAP Format

| Syntax | Size (bit) | Notes |
|---|---|---|
| # EMCID | Variable | The number of EMBS programs |
| for (i=0; i<n; i++) | — | n = # EMCID |
| { | | |
| EMCID | Variable | the EMBS program ID |
| DBSize | Variable | Size of the data burst |
| EDIUC | Variable | EMBS DIUC indicating MAC, Reption, broadcast period |
| NumFollows | Variable | Number of EMCID allocated in sequence that are of the same size. |
| for (j=0; j<NumFollows; j++) { | — | |
| EMCID | variable | List of each EMCID that are of the same size whose data burst are allocated in sequence in the EMBS zone |
| i++; | — | — |
| } | — | |
| } | — | |

In Table 1, LA_Count is a variable sized bit that indicates a number of cycles used in a link adaptation process (discussed in further detail herein above with respect to FIG. 9). The SDM_Burst value is a variable sized bit that indicates whether or not a SDM_Burst is present in the EMBS Time-Zone 515 and, if present, the size of the SDM_Burst that is present at the end of the EMBS MAP. # EMCID is a variable sized bit that indicates the number of EMBS data bursts are in the current EMBS Time-Zone 515. EMCID is the EMBS program ID. DBSize is a variable sized bit that indicates a size of an EMBS data burst. EDUIC is a variable sized bit that indicates a MAC Repetition and broadcast period. NumFollows is a grouping variable that indicates a number of EMCID's that are the same size.

For example, there can be 10 EMBS programs wherein EMCID #1, #3, #7-10 are of the same size of k2 and the rest are of the same size of k3. Table 2 illustrates the EMBS Map including the corresponding grouping of EMBS programs.

TABLE 2

EMBS-MAP Example

| Syntax | Value | Notes |
|---|---|---|
| LA_Count | 100 | EMBS transmission parameters may change after 100 cycles. |
| SDM_Burst | k1 | SDM_Burst is of K1 Physical Resource Block (PRB), starting at the end of EMBS-MAP. |
| # EMCID | 10 | 10 EMCID |
| EMCID | EMCID#1 | EMCID #1 |
| DBSize | k2 | Size of the data burst is k2 PRB |
| EDIUC | EDIUC_i | EMBS DIUC indicating MAC, Repetition, broadcast period |
| NumFollows | 5 | Number of EMCID allocated in sequence that are of the same size. |

TABLE 2-continued

EMBS-MAP Example

| Syntax | Value | Notes |
|---|---|---|
| EMCID | EMCID#3 | |
| EMCID | EMCID#7 | |
| EMCID | EMCID#8 | |
| EMCID | EMCID#9 | |
| EMCID | EMCID#10 | |
| EMCID | EMCID#2 | EMCID #2 |
| DBSize | k3 | Size of the data burst is k3 PRB |
| EDIUC | EDIUC_j | EMBS DIUC indicating MAC, Repetition, broadcast period |
| NumFollows | 3 | Number of EMCID allocated in sequence that are of the same size. |
| EMCID | EMCID#4 | |
| EMCID | EMCID#5 | |
| EMCID | EMCID#6 | |

In some embodiments, the EMBS server 150 uses a minimum-overhead EMBS security design. A EMBS Service Traffic Encryption Key (EMBS TEK) is transmitted periodically so that any subscriber station that is subscribed for the EMBS service is able to start to decode a certain EMBS program after an average waiting period that is half of the EMBS TEK transmission period. To avoid undue overhead, EMBS TEK are not transmitted too often. In some such embodiments, as shown in Table 1, the SDM_Burst is used for multiplexing the EMBS TEK with other low duty-cycle EMBS service, (e.g., the broadcasting of TV channel content). In the event that the operator offers multiple EMBS service packages, multiple EMBS TEK could be broadcast using SDM_Burst at different times.

In some embodiments, the EMBS server 105 is configured to provide the same EMBS MAPs to each of the base stations (e.g., BS 101-103 and FBS 104-106) located in its service zone. In additional and alternative embodiments, the EMBS server 105 is configured to provide separate EMBS MAPs to each of the base stations (e.g., BS 101-103 and FBS 104-106) located in its service zone such that an EMBS MAP transmitted by BS 101 is different from an EMBS MAP transmitted from BS 103 and different from an EMBS MAP transmitted from FBS 105.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless communications network, a subscriber station capable of multi-broadcast service, said subscriber station comprising:
   a receiver configured to receive a downlink frame, the downlink frame comprising:
      an enhanced multi-broadcast service map located in an enhanced multi-broadcast service subframe;
      a Security and Data Multiplexing (SDM) burst area, the SMD burst area adapted to carry security information; and
      a plurality of multi-broadcast data bursts,
   wherein the receiver is configured to decode the enhanced multi-broadcast service map to identify locations of at least one of the plurality of enhanced multi-broadcast data bursts.

2. The subscriber station as set forth in claim 1, wherein the SDM burst area carries a traffic encryption key.

3. The a subscriber station as set forth in claim 1, wherein said enhanced multi-broadcast service map comprises a counter parameter indicating an update cycle of at least one multi-broadcast single frequency network configuration parameter.

4. The subscriber station as set forth in claim 3, wherein the receiver is configured to read decode a subsequent enhanced multi-broadcast service map when the counter equals zero.

5. The subscriber station as set forth in claim 3, wherein the receiver is configured to store the counter in a memory and decrease the counter during a cycle when the subscriber station decodes at least one enhanced multi-broadcast data burst.

6. The subscriber station as set forth in claim 1, wherein the subscriber station is capable of identifying the downlink frame as one of an exclusive enhanced multi-broadcast service frame and a mixed enhanced multi-broadcast service-unicast (EMBS/unicast) frame.

7. The subscriber station as set forth in claim 1, wherein the subscriber station is capable of waking at a time specified by the enhanced multi-broadcast map in order to decode at least one enhanced multi-broadcast data burst.

8. The subscriber station as set forth in claim 1, wherein the subscriber station is capable of decoding at least one of a subsequent enhanced multi-broadcast service map and a subsequent downlink MAP in response to an error in decoding an enhanced multi-broadcast service data burst.

9. The subscriber station as set forth in claim 1, wherein the subscriber station is capable of decoding a subsequent downlink MAP in response to an error in decoding an enhanced multi-broadcast service map.

10. The subscriber station as set forth in claim 1, wherein the downlink frame further comprises:
    at least one of a superframe control header and a downlink map located in the beginning of the downlink frame;
    an EMBS flag located in the beginning of the downlink frame.

11. A wireless communication network comprising a plurality of base stations, at least one of the base stations capable of providing enhanced multi-broadcast service to a plurality of subscriber stations, the at least one base station comprising:
    a transmitter configured to send a downlink frame, the downlink frame comprising:
    an enhanced multi-broadcast service map located in an enhanced multi-broadcast service subframe of the downlink frame, the enhanced multi-broadcast service map configured to identify locations of at least one enhanced multi-broadcast data bursts;
    a Security and Data Multiplexing (SDM) burst area, the SDM burst area adapted to carry security information; and
    a plurality of multi-broadcast data bursts.

12. The network as set forth in claim 11, wherein the SDM burst area carries a traffic encryption key.

13. The network as set forth in claim 11, wherein the enhanced multi-broadcast service map comprises a counter parameter indicating an update cycle of at least one multi-broadcast single frequency network configuration parameter.

14. The network as set forth in claim 11, wherein the downlink frame further comprises downlink control signaling configured to identify a location of the enhanced multi-broadcast service map.

15. The network as set forth in claim 11, wherein the downlink frame is one of a plurality of frames included in a superframe, and wherein the downlink frame further comprises a superframe control signaling, the superframe control signaling comprising a flag configured to identify the frame as one of an exclusive enhanced multi-broadcast service frame and a mixed enhanced multi-broadcast service-unicast (EMBS/unicast) frame.

16. The network as set forth in claim 11, wherein the enhanced multi-broadcast service map is configured to group enhanced program IDs with corresponding values together.

17. The network as set forth in claim 11, wherein the enhanced multi-broadcast service map identifies locations of one or more of the plurality of enhanced multi-broadcast service data bursts in a plurality of downlink frames.

18. For use in a wireless communication network capable of communicating with a plurality of subscriber stations, a method of providing enhanced multi-broadcast service, the method comprising:
    transmitting a downlink frame, the downlink frame comprising:
    an enhanced multi-broadcast service map located in an enhanced multi-broadcast service subframe of the downlink frame, the enhanced multi-broadcast service map configured to identify locations of at least one enhanced multi-broadcast data bursts;
    a Security and Data Multiplexing (SDM) burst area, the SDM burst area adapted to carry security information; and
    a plurality of multi-broadcast data bursts.

19. The method as set forth in claim 18, further comprising transmitting a traffic encryption key in the SDM burst area.

20. The method as set forth in claim 18, further comprising transmitting a plurality of traffic encryption keys in the SDM burst area at different times.

21. The method as set forth in claim 18, including, in the enhanced multi-broadcast map, a counter parameter indicating an update cycle of at least one multi-broadcast single frequency network configuration parameter.

22. The method as set forth in claim 18, further comprising transmitting a flag configured to identify the frame as one of an exclusive enhanced multi-broadcast service frame and a mixed enhanced multi-broadcast service-unicast frame.

23. The method as set forth in claim 18, further comprising grouping, in the enhanced multi-broadcast service map, enhanced program IDs with corresponding values together.

* * * * *